Patented Feb. 13, 1923.

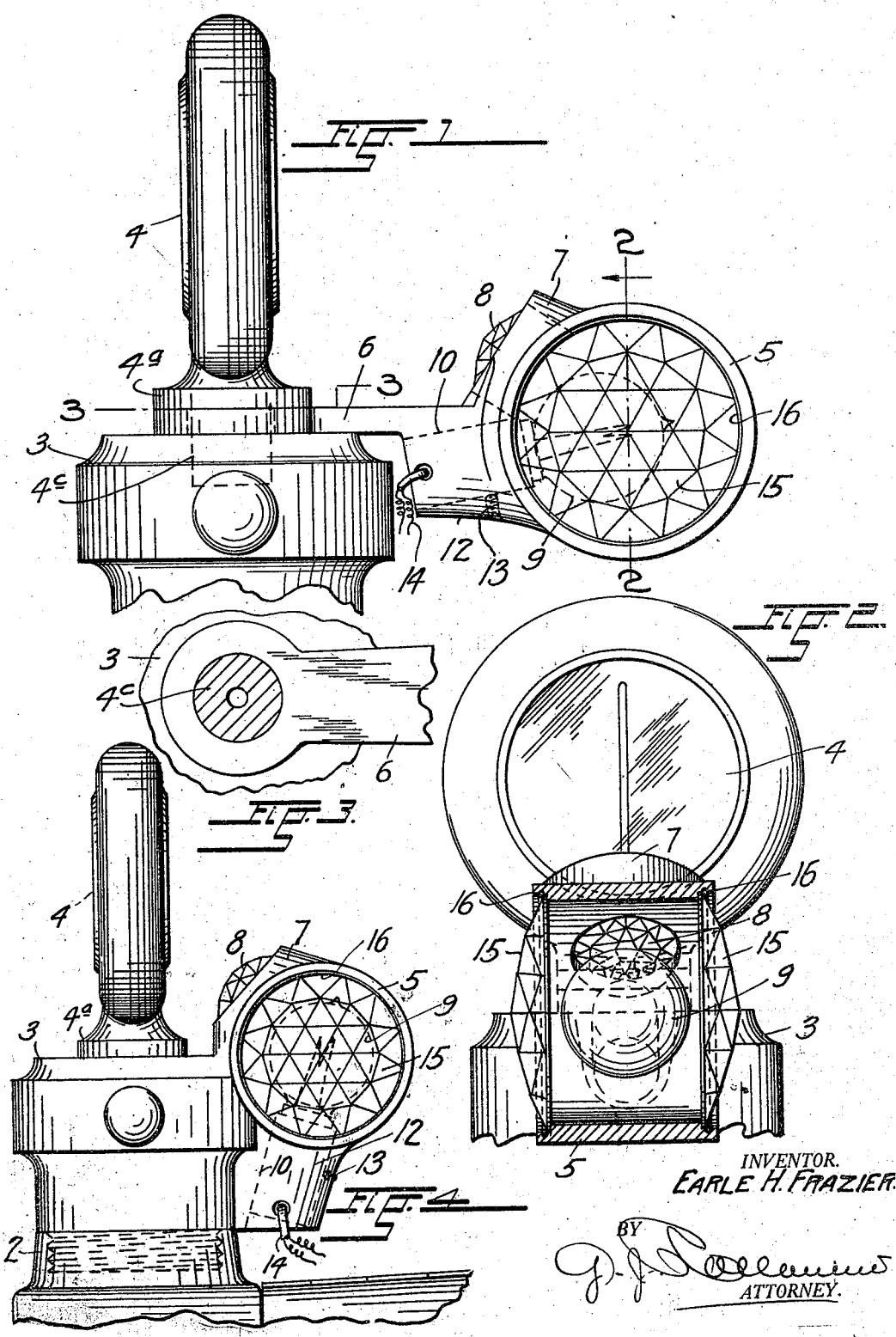

1,444,965

UNITED STATES PATENT OFFICE.

EARLE H. FRAZIER, OF DENVER, COLORADO.

LIGHT FOR AUTOMOBILES.

Application filed July 23, 1921. Serial No. 487,027.

*To all whom it may concern:*

Be it known that I, EARLE H. FRAZIER, a citizen of the United States, residing at Denver, in the county of Denver and State of Colorado, have invented certain new and useful Improvements in Lights for Automobiles, of which the following is a specification.

This invention relates to lights for automobiles and its principal object is to provide a light of simple, attractive and practical construction which by connection with the filler neck or cap of an automobile radiator, artificially illuminates the face of a thermometric appliance of the type commonly known as "motometers" by which the temperature in the radiator is indicated to the driver of the vehicle.

Another object of the invention is to provide in a light of the above described character, side lenses, preferably made of colored glass, which indicate to pedestrians or drivers of approaching conveyances the direction of travel of the vehicle to which the illuminating device is applied.

With the above and other objects in view, all of which will fully appear in the course of the following description, my invention consists in the constructions, combinations and arrangement of parts such as have been shown in the accompanying drawings in which like characters of reference designate corresponding parts throughout the several views, and in which—

Figure 1 is a side elevation of the light in its operative position relative to the filler neck of an automobile radiator and a motometer of conventional construction which is fastened to the cap thereof;

Figure 2, a section taken on the line 2—2, Figure 1;

Figure 3, a fragmentary section along the line 3—3, Figure 1; and

Figure 4, an elevation similar to that of Figure 1, showing a modified construction of my invention in which the lamp housing of the light is formed in integral connection with the cap of the radiator.

Referring more in detail to the drawings, the reference character 2 designates the filler neck of an automobile radiator, 3 a screw cap at the upper end thereof, and 4 a motometer which is fastened to the cap.

Motometers of the type most commonly used are equipped with a foot 4$^a$ which rests on the radiator cap, and a relatively central screw threaded tubular stem 4$^c$, shown in broken lines in Figure 1, which extends through an opening in the cap and cooperates with a nut engaging with the under side thereof to secure the device in a position in which its dial faces the driver of the vehicle. The light of the construction shown in Figures 1 and 2 consists of a cylindrical open ended lamp housing 5, formed integrally at the end of a flat arm 6, which at its opposite extremity has an opening adapted to receive the before mentioned stem 4$^c$ of the motometer. By placing the arm of the light between the cap 3 and the foot of the motometer with the stem of the latter passing through the opening at the end of the same, the device is securely clamped in its operative position, in which the lamp housing at the end of the arm extends rearward of the filler neck of the radiator.

The lamp housing has in its circumferential surface adjacent and above its juncture with the arm, an enlargement 7 provided with an upwardly slanting circular opening which at its outer end is closed by a lens 8. When the light is in its operative position the axis of this opening intersects with a horizontal line passing through the center of the motometer dial so that the light rays of the lamp inside the housing, emitted through the lens at the end of said opening, will illuminate the dial to render the temperature indications on the face thereof clearly visible to the occupants of the vehicle when it is driven in the dark. The lamp 9 of the light, which is of the incandescent electric type, is screwed in an electric socket 10 inserted in a hollow enlargement 12 of the housing adjacent and beneath its juncture with the arm 6. The socket is held in position by a set screw 13 and is equipped with the usual means to connect the lamp in an electric circuit, the wires 14 of which extend through an opening in a side of the enlarged portion of the housing.

The open ends of the housing are closed by lenses 15 of a distinctive color, preferably green, and the three lenses are removably held in place by split spring rings 16 fitted in the outer ends of their respective openings. The lenses have crystal form faces which not only magnify the light rays emitted from the lamp but also render a most pleasing and attractive appearance to the device.

In the operation of my invention, the lamp is connected in the lighting or ignition circuit of an automobile and a switch may be placed on the dash board of the same to control the circuit at the will of the driver. The light rays, passing through the lens 8 at the end of the upwardly slanting opening of the lamp housing illuminate the face of the motometer, and the colored lenses at opposite ends of the housing indicate the direction of travel of the car to pedestrians or the drivers of approaching vehicles. The device is readily installed and removed, and by its unique form and arrangement of parts is of attractive appearance in day time as well as at night. In the modified construction shown in Figure 4, the lamp housing is formed as an integral part of the radiator cap, and the arrangement of its lens covered openings and its socket holding enlargement is substantially the same as shown in the first form of my invention.

While I have shown and described the combined motometer and direction indicating light in the best forms at present known to me, it is possible that differences in the construction of the radiator caps or the motometers to which it is applied may demand changes in the construction and arrangement of its parts, and I desire it understood that such variations, relating mainly to details of form and position, may be availed of within the spirit of my invention and within the scope of the hereunto appended claims.

What I claim and desire to secure by Letters-Patent is:—

1. The combination with an automobile and a motometer thereon, of a lamp housing extending rearward of the motometer and a lamp in said housing, the housing having a lens-covered opening slantingly disposed to direct the light rays from the lamp, onto the face of the motometer, and at opposite sides of said opening, lens-covered openings disposed to cast the light rays of the lamp laterally with relation to the automobile.

2. The combination with a cap for the filler neck of an automobile radiator, of a lamp housing connected therewith, and a lamp in said housing, the housing having a lens-covered opening disposed to direct the light rays of the lamp in an upwardly slanting direction with reference to a radiator to which the cap is attached, and at opposite sides of said opening, lens-covered openings disposed to direct the light rays laterally of the radiator.

3. The combination with the filler neck of an automobile radiator, of a lamp housing projecting rearwardly thereof, and a lamp in said housing, the housing having a lens-covered opening disposed to direct the light rays of the lamp in an upwardly slanting direction with reference to the radiator, and at opposite sides of said opening, lens-covered openings disposed to direct the light rays laterally of the radiator.

In testimony whereof I have affixed my signature.

EARLE H. FRAZIER.